US012468520B2

(12) United States Patent
Rahill-Marier et al.

(10) Patent No.: US 12,468,520 B2
(45) Date of Patent: Nov. 11, 2025

(54) SEAMLESS SYNCHRONIZATION ACROSS DIFFERENT APPLICATIONS

(71) Applicant: Palantir Technologies Inc., Denver, CO (US)

(72) Inventors: Bianca Rahill-Marier, New York, NY (US); Jishai Evers, Tel Aviv (IL); Quentin Spencer-Harper, London (GB); Meghan Nayan, Seattle, WA (US); Charles Perinet, London (GB); Damian Rusak, London (GB); Mark Schafer, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 192 days.

(21) Appl. No.: 17/958,656

(22) Filed: Oct. 3, 2022

(65) Prior Publication Data

US 2023/0153095 A1 May 18, 2023

Related U.S. Application Data

(60) Provisional application No. 63/252,141, filed on Oct. 4, 2021.

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
None
See application file for complete search history.

(56) References Cited

U.S. PATENT DOCUMENTS

| 6,880,006 B1* | 4/2005 | Tagg | G06Q 10/10 709/225 |
| 10,705,836 B2* | 7/2020 | Chandra | G06F 8/453 |
| 11,640,689 B1* | 5/2023 | Nikitenko | G06F 9/45545 345/506 |

(Continued)

OTHER PUBLICATIONS

Beltran, "Automatic provisioning of multi-tier applications in cloud computing environments", 2015, J Supercomput (Year: 2015).*

(Continued)

*Primary Examiner* — Hossain M Morshed
(74) *Attorney, Agent, or Firm* — Sheppard Mullin Richter & Hampton LLP

(57) ABSTRACT

A computing system and methods are provided for executing an application framework to provision a pipeline or workspace which may include applications that collaborate, such as, in performing a physical actuation of a physical component. The provisioning may include determining or receiving an indication of the applications to be installed and contextual information of each of the applications. The contextual information includes data objects, data types, or data formats supported by each of the applications and relationships among the applications. The computing system may provision one or more of the applications based on the indication of the applications to be installed and the contextual information. The computing system may receive an indication of an update at a first application of the applications and propagate the update to a subset of the applications based on the contextual information.

20 Claims, 8 Drawing Sheets

(56) References Cited

U.S. PATENT DOCUMENTS

| | | | |
|---|---|---|---|
| 11,748,160 B1* | 9/2023 | Bitincka | G06F 9/4887 |
| | | | 718/102 |
| 2013/0067476 A1* | 3/2013 | Rosenberg | G06F 9/4843 |
| | | | 718/100 |
| 2013/0179723 A1* | 7/2013 | Tang | H04L 1/22 |
| | | | 714/4.12 |
| 2014/0372356 A1* | 12/2014 | Bilal | G06N 5/02 |
| | | | 706/46 |
| 2016/0337226 A1* | 11/2016 | Padala | H04L 67/53 |
| 2019/0243836 A1* | 8/2019 | Nanda | G06F 16/24568 |
| 2020/0167708 A1* | 5/2020 | Rajasekar | G06Q 10/06316 |
| 2021/0248165 A1* | 8/2021 | Fry | G06F 16/907 |
| 2022/0051017 A1* | 2/2022 | Choi | G06V 10/764 |
| 2022/0100563 A1* | 3/2022 | Gutierrez | G06F 9/3802 |
| 2022/0329847 A1* | 10/2022 | Parashar | G06T 7/11 |

OTHER PUBLICATIONS

Urgaonkar, "Dynamic Provisioning of Multi-tier Internet Applications", 2005, IEEE (Year: 2005).*
Singh, "Dynamic Provisioning of Multi-tier Internet Applications", 2015, IEEE (Year: 2015).*
Chai, "Byzantine fault tolerance for session-oriented multi-tiered applications", 2013, J. Web Science (Year: 2013).*
Hedge, "SCoPe: A Decision System for Large Scale Container Provisioning Management", 2016, IEEE (Year: 2016).*
Extended European Search Report dated Feb. 16, 2023, issued in related European Patent Application No. 22199441.1 (9 pages).

* cited by examiner

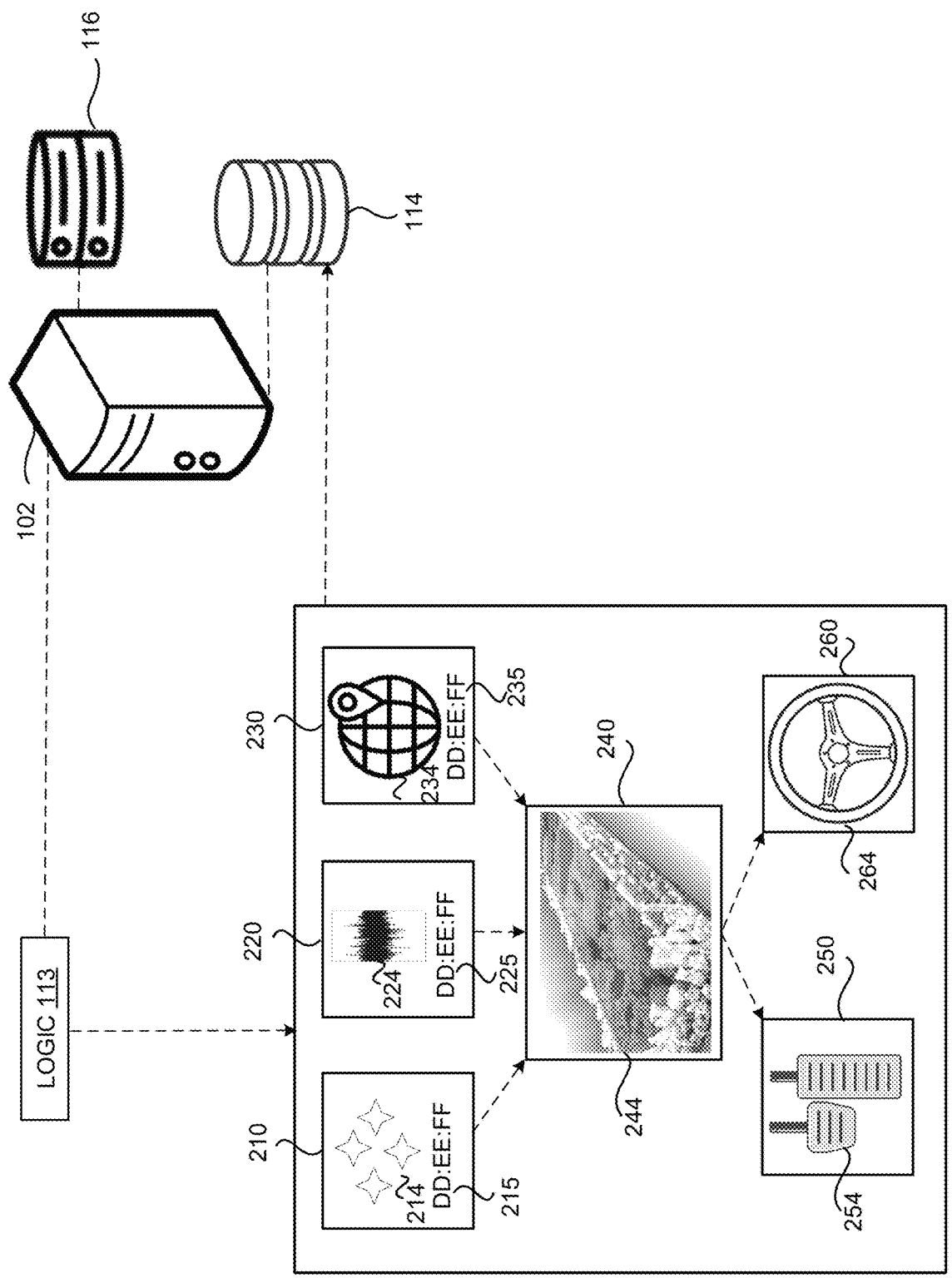

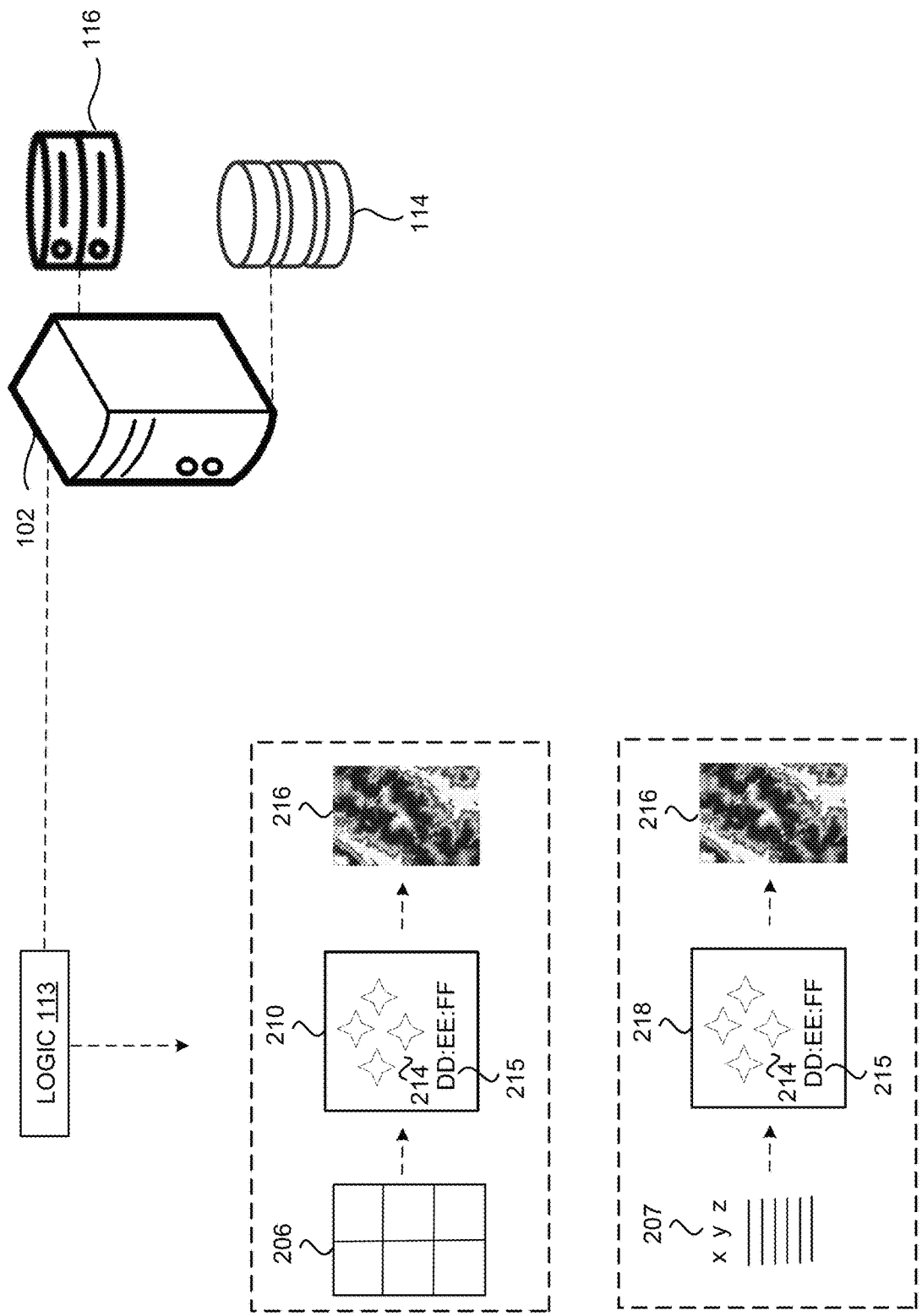

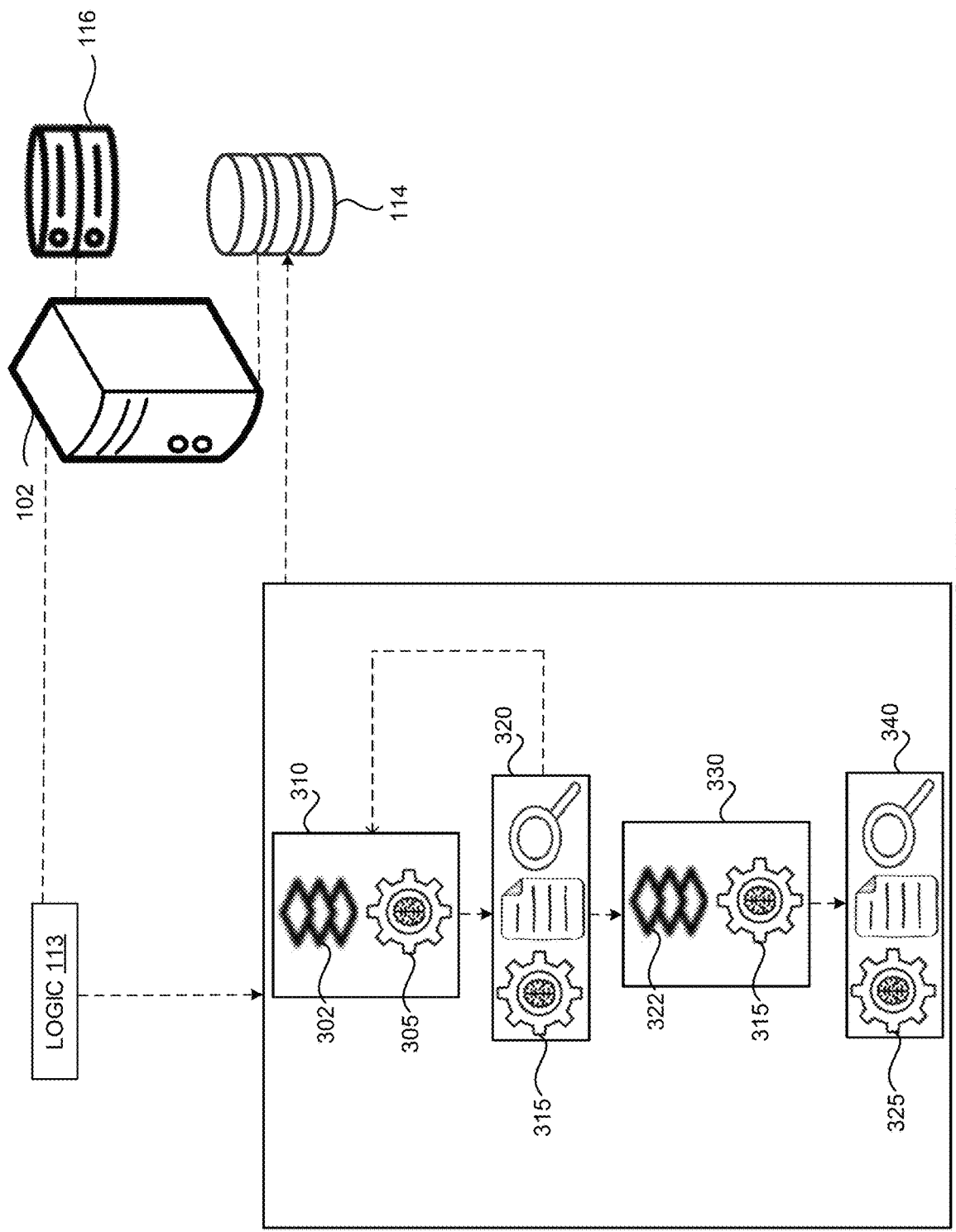

SEAMLESS SYNCHRONIZATION ACROSS DIFFERENT APPLICATIONS

CROSS-REFERENCE TO RELATED APPLICATION

This application claims the benefit under 35 U.S.C. 119(e) of U.S. Provisional Application No. 63/252,141, filed Oct. 4, 2021, the content of which is hereby incorporated in its entirety.

FIELD OF THE INVENTION

This disclosure relates to approaches of collaboration or synchronization among different applications or modules, and implementing, configuring, or provisioning different applications or modules to run concurrently and simultaneously while communicating with one another.

BACKGROUND

Data creation and consumption has been increasing at prolific rates. In particular, annual data creation increased from 1.2 zettabytes (trillion gigabytes) to an estimated 60 zettabytes from 2010 to 2020. Data is expected to proliferate at ever increasing rates due in part to increased accessibility to data and computing applications and the rise of remote work. In 2025, an estimated 180 zettabytes of data is projected to be created. This Gargantuan increase in data creation, along with a concurrent increase in complexity of data, is a catalyst that has brought about new complexities and requirements in performing computing tasks that involve processing such data. In particular, the rise in the amount and complexities of data has resulted in the practice of running multiple applications or modules concurrently in order to extract, transform, analyze, maintain, store, validate, and/or propagate the data to another source or destination. Frameworks used to support such computing tasks need to be adapted to the status quo of today's data environment in order to address and eliminate bottlenecks in performance of computing tasks.

SUMMARY

Various embodiments of the present disclosure can include computing systems, methods, and non-transitory computer readable media configured to execute instructions that, when executed by one or more processors, cause a computing system to execute an application framework to provision or configure a set of computing tasks that involve applications or modules. Logic and/or constructs of the application framework may be stored on a server, for example, such as a cloud server. The provisioning may include determining or receiving an indication of the applications to be installed into a pipeline, workspace, or other collaborative framework or setting, and receiving contextual information of each of the applications. The contextual information may include one or more data objects, data types, data formats, and/or other data attributes supported or used by, relied upon, or compatible with each of the applications, and one or more relationships among the applications.

The instructions may cause the computing system to provision or configure one or more of the applications based on the indication of the applications to be installed and the contextual information. The instructions may cause the computing system to receive an indication of an update at a first application of the applications. In some embodiments, if applicable, the instructions may cause the computing system to cache the update at a cache associated with the computing system. The instructions may cause the computing system to propagate the update to any appropriate applications based on the contextual information.

In some embodiments, the update is indicative of a change in a subset of data in the first application or a completion of a task in the first application.

In some embodiments, the one or more relationships comprise a reliance of a second application upon an output of the first application; and the propagating of the update comprises determining a generation of a data output from the first application; and in response to the determination of the generation of the data output, ingesting the data output into the second application.

In some embodiments, the instructions further cause the system to: in response to receiving the indication of the update at the first application, caching the update at a cache; and the propagation of the update comprises propagating the update directly from the cache.

In some embodiments, the instructions further cause the system to: receive an indication of a second update externally from the applications, the second update comprising a modification in a data format, a data object, or a data type of data that is ingested into the first application or a second application; determine that the second update causes the modified data format, the modified data object, or the modified data type to be incompatible with an accepted input of the first application or the second application; determine one or more updated applications that are compatible with the modified data format, the modified data object, or the modified data type; and replace the incompatible first application or the incompatible second application based on the determined one or more updated applications.

In some embodiments, the instructions further cause the system to: adjust running statuses of the applications based on an amount of available computing resources on a computing device on which the applications run, the running statuses comprising an operational state, a paused state that consumes less computing resources compared to the operational state, and an inactive state that consumes less computing resources compared to the paused state, the adjusting of the running statuses comprising determining a number of the applications to be in an operational state.

In some embodiments, the adjusting of the running statuses comprises determining particular applications to convert to the operational state based on frequencies at which the applications ingest data.

In some embodiments, the applications within the pipeline or the workspace collaboratively determine an actuation to be performed on a physical component.

In some embodiments, the determination or receiving of the contextual information of each of the applications comprises determining the relationships based on comparisons between second data objects, second data formats, or second data types generated as outputs by the respective applications and the data objects, data types, or data formats supported by the applications. For example, upon receiving an indication of or determining a data type, a data object, or a data format to be ingested, the computing system may determine any applications to which the data type, the data object, or the data format may be ingested and/or are compatible. Such information may be stored within a database associated within the computing system, such as a registry. These applications may also be relevant to a computing task being performed, determined based on respective types of the applications. The computing system may then either determine a particular application or receive a selection of such. The computing system may then determine a second data object, second data format, or a second data type generated as one or more outputs by the particular application, and one or more other applications that are compatible with, or may successfully ingest data of or consistent with the second data object, the second data format, or the second data type. The computing system may then either determine a particular other application or receive a selection of such. The computing system may repeat such a process for all subsequent applications. Additionally, the computing system may determine a final data type, a final data object, or a final data format that is to be generated as an end result by the workspace and pipeline and determine or verify, at each stage, that data outputs generated may be converted or transformed, either directly or indirectly, to the final data type, the final data object, or the final data format.

In some embodiments, the contextual information further comprises ranges of values of data or ranges of times at which data was captured.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2B illustrates an example implementation in which updated data is propagated to one or more applicable applications, consistent with FIGS. 1 and 2A, in accordance with various embodiments.

FIG. 2C illustrates an example implementation in which an updated data attribute, such as an object representation, data format, or data type, results in a modification of a sequential relationship among applications, consistent with FIGS. 1, 2A, and 2B, in accordance with various embodiments.

FIG. 3 illustrates an example implementation in which a data object is sequentially or cyclically modified. in accordance with various embodiments.

DETAILED DESCRIPTION

Figure 1:
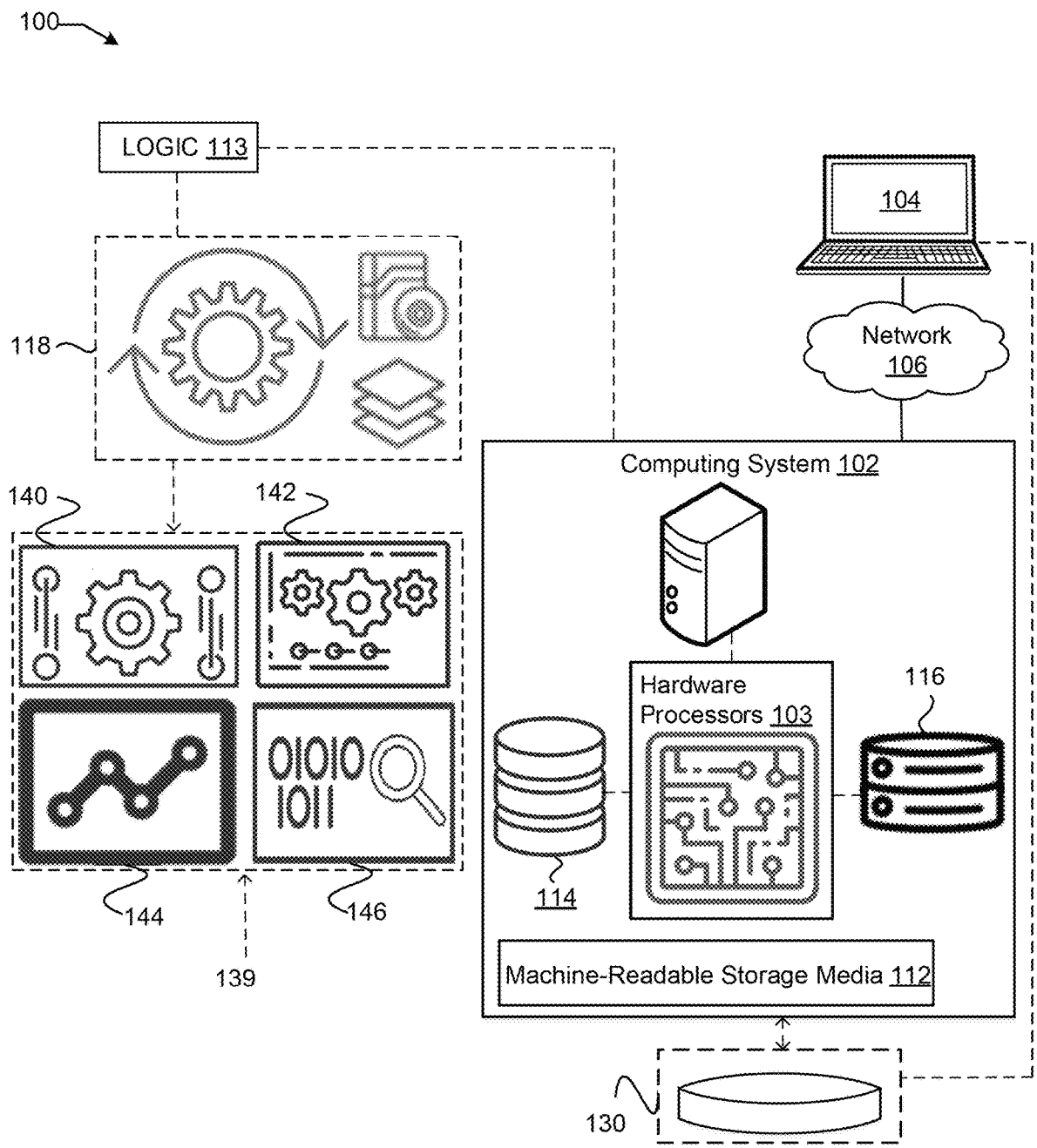
FIG. 1 illustrates an example environment 100, in accordance with various embodiments, of a computing system 102, that implements or executes an application framework 118, in accordance with various embodiments. As a result of the executing of the application framework, applications of a workspace or a pipeline may be provisioned in a collaborative setting.

Conventional approaches of performing computing tasks, such as executing a data pipeline or configuring a workspace, that require multiple applications or modules may be limited due to shortcomings in collaboration and synchronization among the multiple applications. Typically, configuring or provisioning each individual application may entail running a separate system, platform, microservice, service, or product. Each application may run independently, without awareness of context of other applications or changes to relevant data. For example, if data is being updated in a first application, a separate process or a user may detect the update and determine whether the data or a subset thereof is compatible with and ingestible into a second application. Next, a separate process or a user may ingest the update of the data or the subset thereof into the second application. Such a lack of awareness may hinder flexibility or adaptability due to updates, for example, in the data, in protocols or mechanisms in which the applications operate, or in relationships among the applications. Additionally, such a modularized framework may cause delays in setting up separate platforms, ingesting data separately into each application, and individually updating data in each application, all of which hinder performance of the applications and of the computing tasks that rely on the applications. Inefficiencies in these conventional approaches are manifested in consumption of computing power and time. Additionally, these conventional approaches are unreliable because the applications may not receive updates in data or operations due to lack of synchronization with other applications. This inability of synchronization and collaboration of the multiple applications reduces efficiency and effectiveness in performance of computing tasks and further hampers convenience.

To address these shortcomings and to improve an efficiency and user convenience of performing computing tasks, a new approach includes, executing an application framework to configure or provision a computing task or set of computing tasks that involve applications or modules. Each of the applications within the data pipeline or within the workspace collaborates with and is synchronized with the other applications. In this approach, the application framework may be embedded or otherwise provided within a computing system, which may include a server, such as a cloud server.

Logic and/or constructs of the application framework may be stored on the server. The provisioning may include determining or receiving an indication of the applications to be installed into a pipeline or workspace, and receiving contextual information of each of the applications. The indication of the applications may be generated or derived by the logic associated with the application framework. For example, upon receiving an indication of a computing task or a type of computing task from a user or from a computing device, the logic may automatically generate or derive the applications pertaining to or relevant to that computing task or type of computing task. In some embodiments, the user may be an administrator. The logic may receive further feedback from a user regarding a subset (e.g., any or all of) of the generated applications to be selected in this particular task. In other examples, the logic may receive an indication or selection of applications from a user or from a computing device. Subsequently, the logic may receive or derive contextual information of each of the applications. The contextual information may include one or more data objects, data types, data formats, and/or data attributes supported or used by, or compatible with each of the applications, and one or more relationships among each of the applications. For example, the logic may receive such contextual information from a user or a computing device. Additionally or alternatively, the logic may access a storage associated with the computing system, such as a database that stores such contextual information and extract the contextual information. The contextual information may have been previously recorded in the database. The data objects, data types, data formats, and/or data attributes supported by each of the applications may be indicated as acceptable inputs to each of the applications. The relationships among each of the applications may indicate an upstream or downstream relationship among applications. For example, if an output from a first application is intended to be inputted into a second application, a relationship may indicate that the second application receives data immediately or directly from the first application, and that the second application is immediately downstream of the first application. Therefore, any data or procedure updates at the first application would be instantaneously and selectively propagated to the second application, without being propagated to other applications that are incompatible with data objects, data types, data formats, and/or data attributes of the first application, and/or are not immediately downstream of the first application. Such a mechanism would ensure that data received by a second application is indeed relied upon, utilized, supported by, and/or relevant to the second application.

The logic may provision or configure one or more of the applications based on the indication of the applications to be installed and the contextual information. For example, based on the relationships, the logic may generate and/or configure an application programming interface (API), a plugin, and/or implement some other functionality so that an immediate upstream application may communicate with a downstream application. In one implementation, the logic may receive an indication that an upstream application has completed its computing task, or has updated a parameter, and transmit the output or the update from the upstream application to a downstream application. As another example, the logic may receive an indication of an ingestion of data or a modification of existing data. The ingested data or the modified data may be received externally, meaning from a source external to the applications, for example. The logic may selectively propagate the ingested data or the modification to any applications that support data objects, data formats, data types, and/or data attributes consistent with the ingested data or the modified data, without propagating the ingested data or the modified data to other applications that fail to support data objects, data formats, data types, and/or data attributes consistent with the ingested data or the modified data. In particular, the logic may receive an indication of an update at an application of the applications. The update may include an update of data or an update of functionality or a protocol associated with the application. For example, an updated protocol of an application may include an additional step of converting or transforming data from a first format to a second format, whereas previously, the application did not include such a transformation step. The logic may redetermine, based on the transformation of the data to the second format, whether the previously indicated or determined downstream applications still support data of the second format, and/or additional applications that previously did not support data of the first format but support data of the second format. The logic may then propagate the transformed data to the additional applications, but terminate the propagation of the transformed data to the previously indicated or determined downstream applications that support the first format but fail to support the second format. As another example, the update may include a modification of data. The modification of data may be cached at a cache associated with the application framework. Every time a cache is updated, the updates may be propagated to relevant applications, such as, applications that support data objects, data formats, data types, and/or data attributes consistent with the modified data.

The provisioning or configuring of the applications may further include setting access control restrictions or policies of each of the applications. In some embodiments, the access control restrictions or policies may indicate which users, such as non-administrative users have privileges to deploy particular applications and/or particular components or capabilities of the applications. For example, certain users may have access control privileges to deploy the applications or a subset thereof, while other users may only have access control privileges to view data generated by the applications or a subset thereof. Yet other users may have access control privileges to view underlying data, and/or protocols, constructs, or code relied upon by the applications or a subset thereof. In some embodiments, access controls may be provided to users via two mechanisms, a link to access a workspace in which the applications reside or particular applications within the workspace, or blanket access, or selective access, to the workspace. In the former mechanism, a particular user that requires a link to access the workspace would be unable to access the workspace or applications within the workspace without having the link, or if the link has been deactivated or expired. Additionally, users that have access control privileges in different workspaces may switch among the different workspaces. Furthermore, users that have access control privileges to read and/or write in different workspaces may initiate requests to transmit data among the different workspaces, subject to approval across different organizations, groups, or categories of users. As a particular illustrative example, a user of a first organization may write in or modify an existing workspace, and/or create a new workspace, that may be accessible to or deployed by users in a second organization. However, the newly written or modified data, and/or the new workspace, may require approval by the second organization, such as an administrator of the second organization, prior to being populated to the second organization.

The logic may further control collaboration among different users within a workspace depending on their respective access control privileges. For example, two users that both have access control privileges to read and/or write to a particular workspace, may simultaneously perform operations and/or deploy applications within that workspace. If two users simultaneously perform operations that conflict, such as, indicating an ingestion of data into an application from two different and/or conflicting sources, the logic may either indicate such a conflict and terminate further downstream operations until the conflict is resolved or determine which operation takes precedence based on respective roles and/or priorities of the two users. For example, if a first user has a higher priority than a second user, then the logic may persist or execute the operation of the first user rather than the second user.

This new approach obviates the need to open or configure separate frameworks for each application utilized during a computing task. Furthermore, by improving the synchronization and collaboration among different applications, this new approach greatly enhances reliability of computing tasks and reduces delays. Additional benefits of running multiple applications that are synchronized within a single framework include reduction in physical infrastructure requirements such as hardware and conservation of computing resources without interference among applications.

FIG. 1 illustrates an example environment 100, in accordance with various embodiments, of a computing system 102, that implements or executes an application framework 118. The example environment 100 of FIG. 1 may be applicable to subsequent FIGS. 2A, 2B, 2C, 2D, 3, and 4. The application framework 118 may include constructs, programs, instructions and/or protocols that configure or provision applications or modules to perform a computing task or computing tasks within a workspace, a platform, or a pipeline. The application framework 118 may be embedded or associated with logic 113. Thus, the application framework 118 may constitute part of the logic 113. In some embodiments, following execution of the application framework 118, applications or modules that perform a computing task or computing tasks may be generated or populated within a collaborative platform, pipeline, or workspace. In some embodiments, a database 114 may store or cache information of, or associated with each of the applications or modules, and/or updates or modifications to, or associated with each of the applications or modules. In some embodiments, the computing system 102 may include physical or cloud computing resources or servers. Besides the application framework 118 and/or the logic 113, no additional coding may be required to provision the applications or modules.

The example environment 100 can include at least the computing system 102 and at least one computing device 104. The computing system 102 and the computing device 104 can each include one or more processors and memory. The processors can be configured to perform various operations by interpreting machine-readable instructions, for example, from a machine-readable storage media 112, which may store the instructions to be transmitted to, interpreted by, and executed by the logic 113. The processors can include one or more hardware processors 103 of the computing system 102 that include the logic 113 which can be configured to implement or execute the application framework 118.

In general, an entity or a user operating the computing device 104 can interact with the computing system 102 over a network 106, for example, through one or more graphical user interfaces and/or application programming interfaces. In some embodiments, the computing device 104, or a user operating the computing device 104, may provide input or feedback regarding particular applications 140, 142, 144, and 146, which may constitute part of a platform, workspace, or a pipeline (hereinafter "workspace") 139. In some embodiments, workspaces may be switched between based on feedback or input from a user. The applications 140, 140, 142, 144, and 146 may perform any of data processing, analysis, monitoring, alerting, generating, extracting, transforming, maintaining, storing, validating, and/or propagating.

The workspace 139 may be implemented or operated on the computing device 104 and/or a different computing device. The input or feedback may include data objects, data formats, data types, and/or other data attributes supported by each of the particular applications 140, 142, 144, and 146, and/or relationships among the particular applications 140, 142, 144, and 146. The data attributes may include, for example, a range of times at which data was obtained, a range of data values, and/or an amount of data of a particular object, format, or type that may be ingested by an application. Such input or feedback may be stored or cached within the database 114.

The environment 100 may also include one or more data stores 130 accessible to the computing system 102. The data stores 130 may be accessible to the computing system 102 either directly or over the network 106. In some embodiments, the data stores 130 may store data that may be accessed by the logic 113 to provide the various features described herein. For example, the data stores 130 may store instructions of, or within, various constructs embodied in the application framework 118 and/or are otherwise incorporated within the logic 113. In some instances, the data stores 130 may include federated data stores, databases, or any other type of data source from which data may be stored and retrieved, for example.

The computing system 102 may further be associated with a cache 116, which caches a subset of objects stored in the first database 114. In some embodiments, the cache 116 may cache any data and/or updates, for example, to data, that are to be propagated to selected other applications. In some embodiments, the cache 116 may cache data objects on a basis of a frequency of updating and/or a frequency of access. Thus, the cache 116 may selectively cache data objects that are most frequently updated and/or accessed.

Figure 2A:
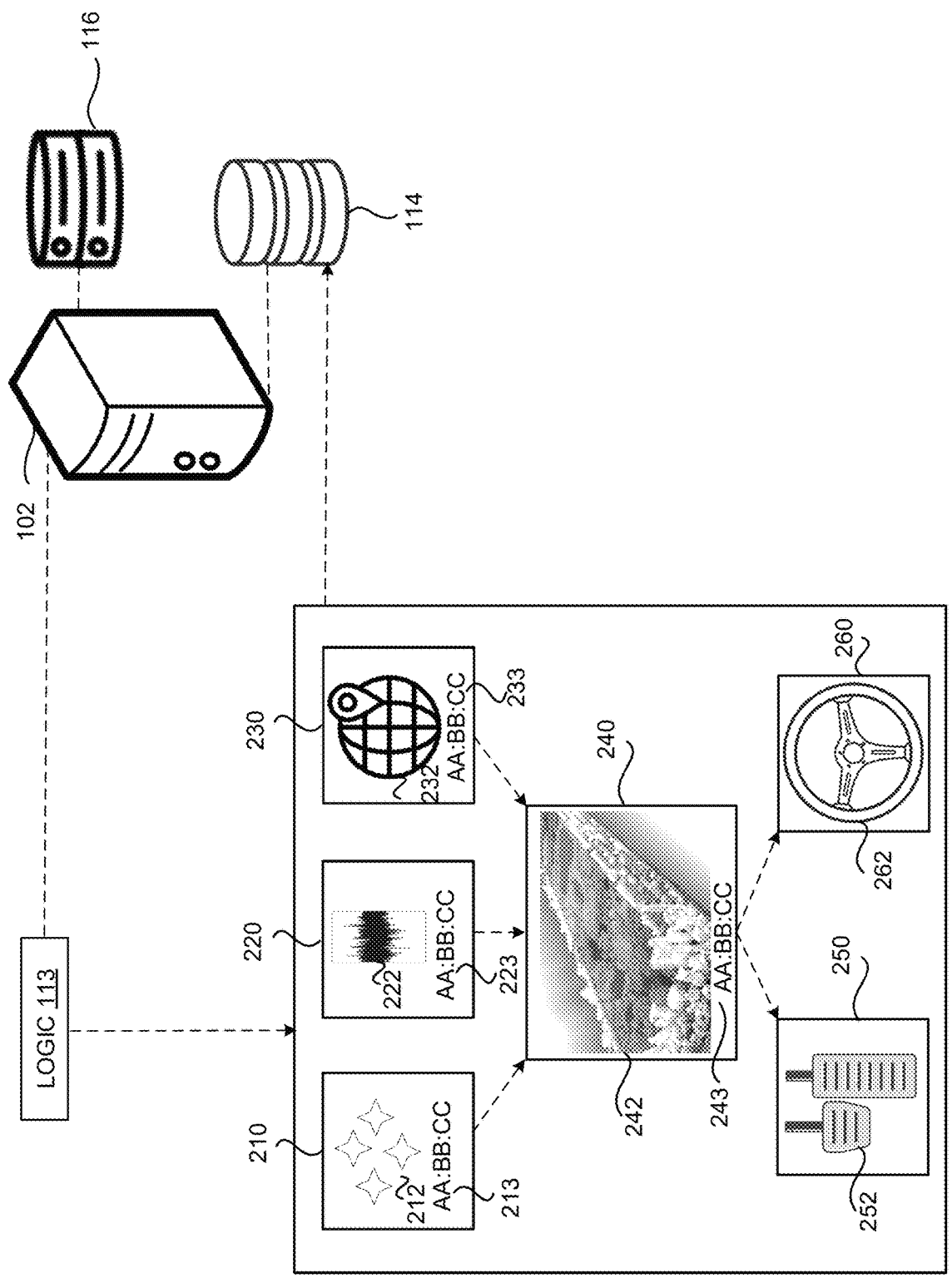
FIG. 2A illustrates an example implementation of a resulting execution of a application framework, consistent with FIG. 1, in accordance with various embodiments.

FIG. 2A illustrates an example implementation of a resulting execution of an application framework such as the application framework 118. The logic 113 may receive an indication of particular applications to be provisioned, or a particular computing task and determine which particular applications to be provisioned. As an example, the logic 113 may receive an indication from a user on the computing device 104 that a driving or a navigation task is to be performed. The logic 113 may determine particular applications that are utilized in, or pertain to, such a task. The logic 113 may receive a further input or indication regarding a subset (e.g., any or all) of the particular applications that are to be provisioned. Alternatively, the logic 113 may receive an indication of the particular applications that are to be provisioned. Although the examples described below focus on a driving or navigation example, the examples are merely to illustrate the principles of executing a application framework and how the applications are synchronized. The implementation is not construed as being limited to a driving or navigation example, but rather, can be directed to any fields that entail data processing and/or analysis. In FIG. 2A, the logic 113 may provision applications 210, 220, 230, 240, 250, and 260 within a single workspace or platform so they are running in an integrated fashion. Six applications are illustrated for the sake of simplicity, but additional applications may also be provisioned. The logic 113 may receive or determine contextual information of each of the applications 210, 220, 230, 240, 250, and 260. The contextual information may include, as previously alluded to, one or more data objects, data types, data formats, and/or data attributes supported or used by, or compatible with each of the applications 210, 220, 230, 240, 250, and 260, and one or more relationships among each of the applications 210, 220, 230, 240, 250, and 260.

In particular, the application 210 may process LiDAR data 212 which has a timestamp 213. The application 220 may process inertial measurement unit (IMU) data 222 which has a timestamp 223. The application 230 may process Global Positioning System (GPS) data which has a timestamp 233. Outputs from the applications 210, 220, and 230 may be ingested into the application 240, which performs localization and/or mapping to determine a current location and map of surroundings. The application 240 may generate a map 242 having a timestamp 243. Outputs from the application 240 may be ingested into the applications 250 and 260. The application 250 may determine actions to be performed on brake and gas pedals by generating brake and gas pedal data 252, such as an amount of acceleration or braking, converted into a numeric amount of force. Meanwhile, the application 260 may determine actions to be performed on a steering wheel by generating steering wheel data 262, as indicated by a numeric angle of rotation and/or an orientation of the steering wheel, which may be represented as a numeric valve from 0 to 360 degrees in the steering wheel data 262. Thus, in FIG. 2A, the applications 210, 220, 230, 240, 250, and 260 collaboratively determine an actuation to be performed on one or more physical components. The determined actuation may be transmitted to a corresponding actuator or another computing resource or system to perform the actuation.

The contextual information may indicate that the application 210 accepts or ingests (i.e., is compatible with or supports) a data type or data object of a raw point cloud and outputs data of a processed point cloud data type or data object, such as a raster. The contextual information may indicate that the application 220 ingests a data type or data object of a time series and outputs a numeric data type or a vector data object. The contextual information may indicate that the application 230 ingests a data type or data object of GPS data and outputs a coordinate data type or a matrix data type. The contextual information may indicate that the application 240 may ingest data types or data objects of a raster, a numeric type or a vector object, and a coordinate data type or a matrix data object. The application 240 may output data types or data objects of a map, and a coordinate data type or a matrix data object indicative of a location. The contextual information may indicate that the applications 250 and 260 may each ingest data types or data objects of a coordinate or a data object of a matrix, indicative of a location. The applications 250 and 260 may each output a numeric data type or a scalar data object. Although only the applications 210, 220, 230, 240, 250, and 260 are illustrated, the logic 113 may obtain such contextual information for any applications, including applications that are unrelated to such a computing task of navigation and driving. Such unrelated applications may be in an inactive status because they are unlikely to be used.

From the contextual information of which data types, data objects, data formats, and/or data attributes are supported by and/or compatible with each of the applications 210, 220, 230, 240, 250, and 260, the logic 113 may determine either a sequential relationship among the applications, such as an upstream and downstream relationship among the applications. In particular, the logic 113 may determine that the application 240 is immediately downstream of the applications 210, 220, and 230, because the application 240 is compatible with and supports the data types, data objects, and/or data formats outputted by each of the applications 210, 220, and 230. Likewise, the logic 113 may determine that the applications 250 and 260 are immediately downstream of the application 240 because the applications 250 and 260 are each compatible with and support the data types, data objects, and/or data formats outputted by the application 240. In some alternative embodiments, the logic 113 may directly receive information of the sequential relationship from a user operating the computing device 104 and validate the sequential relationship by confirming that each immediate downstream application does support or is compatible with the data types, data objects, and/or data formats outputted by an upstream application. In some embodiments, the logic 113 may determine, step-by-step, particular applications that are compatible with and support the data types, data objects, and/or data formats outputted by an upstream application, for example, via a lookup of a registry that indicates such information. The registry may be stored within the database 114. The logic 113 may then receive a selection of a subset of the particular applications from a user operating the computing device 104. For example, the logic 113 may determine all, or multiple, applications that are each compatible with and support the data types, data objects, and/or data formats outputted by each the applications 210, 220, and 230, and receive a selection of one or more applications from the user, such as a selection of the application 240. This process may be repeated at every stage, such as at the output of the application 240, the logic may determine any applications that are compatible with and support the data types, data objects, and/or data formats outputted by the application 240. By determining or resolving sequential relationships between applications, the logic 113 efficiently and selectively propagates updates to relevant applications, as will be illustrated in FIGS. 2B and 2C. These updates include updates to data and/or modifications to the applications themselves.

FIG. 2B illustrates an implementation in which the logic 113 detects or receives a notification of updated data and propagates the updates to a downstream application. In some embodiments, the updated data may be originated from a source external to the applications 210, 220, 230, 240, 250, and 260. In particular, the updated data may include updated LiDAR data 214 having an updated timestamp 215, updated IMU data 224 having a timestamp 225, and updated GPS data 234 having a timestamp 235. The logic 113 may determine which applications are compatible with and support the data objects, data types, and/or data formats consistent with the updated data and/or which particular applications have been selected to receive such updated data. In the implementation of FIG. 2B, the application 240 may be determined to be compatible with and support the data objects, data types, and/or data formats consistent with the updated data, and/or selected to receive such the data objects, data types, and/or data formats. The logic 113 may further determine to refrain from, or not propagate the data updates to, other applications that are incompatible with and fail to support the data objects, data types, and/or data formats consistent with the updated data, such as the applications 250 and 260, which do not support data types or data objects of a processed point cloud, or a numeric data type or a vector data object. Here, although the applications 250 and 260 may support an output data type or data format from the application 230, which is of a coordinate data type or a matrix data type, the logic 113 may determine that the applications 250 and 260 are not immediately downstream of the application 230 and are not to directly receive data updates from the application 230. Rather, the data updates from the application 230 may require additional processing or transformation prior to being ingested into the applications 250 and 260. Therefore, the logic 113 may determine which applications data updates should be selectively propagated to not only on the basis of compatibility of data types, data objects, and data formats but also based on the sequential relationships among the applications, such as which applications actually rely upon the data updates. For example, outputs from the application 230 may include unprocessed data object types, whereas the applications 250 and 260 require ingestion of processed data object types. In such a manner, applications that do not support or are incompatible with a particular data format, data object, or data type, would not receive any such data formats, data objects, or data types, and any updates are selectively propagated to relevant applications.

Additionally, the process of propagating data updates may include storing the updated data 214, 224, and 234 at the database 114 and/or caching the updated data 214, 224, and 234 at the cache 116. The logic 113 may then transmit the stored updated data or the cached updated data to the appropriate downstream application, here, the application 240. The logic 113 may hide a direct source of the updated data from the application 240, that is, the logic 113 may not reveal that the computing system 102 has stored or cached the updated data prior to propagation to the application 240, so that the application 240 is unaware that the propagated data is from the database 114 or the cache 116.

In some embodiments, if two or more updates occur simultaneously and/or substantially simultaneously in that they have same timestamps or timestamps within a threshold duration of one another, the logic 113 may indicate such an occurrence and require or prompt a user to provide feedback regarding which update takes precedence. In other embodiments, the logic 113 may persist or select an update that takes precedence based on respective sources of the updates. For example, if a first source provides an update substantially at a same time as a second source, but the first source has a higher priority or trustworthiness compared to the second source, then the logic 113 may select the update provided by the first source as taking precedence over the update provided by the second source.

FIG. 2C illustrates an implementation in which the logic 113 detects or receives a notification of updated data and accordingly updates sequential relationships among the applications. For example, if a format of the raw LiDAR data received by the application 210 was previously in a first file format such as a LAS file format 206, which is one of the file formats supported by the application 210, but the file format of the raw LiDAR data has changed to a second file format such as an American Standard Code for Information Interchange (ASCII) file format 207. The ASCII file format 207 may be unsupported by or incompatible with the application 210. Therefore, the logic 113 may detect such incompatibility and determine a new application 218 that supports and is compatible with the second file format, the ASCII file format 207, and process the second file format to convert that into a third file format such as a raster file format 216, or any of formats supported by immediate downstream applications (e.g., the application 240). The logic 113 may then either disable the application 210 or relegate the application 210 to a background or paused state (as will be further described with respect to FIG. 2D) that is not currently operational and provision the new application 218. In some embodiments, the logic 113 may determine any or all applications that do support and are compatible with the second file format and receive a selection from the user of a particular application from those determined applications. Similarly, if other data characteristics such as data types, data objects, or other data attributes of input data change, thereby resulting in incompatibility with one or more applications, the logic 113 may switch to a new application in a same or similar manner as described above. In such a manner, by having the contextual information of which data types, data objects, or data formats are supported by each application, the logic 113 may adapt to changes, for example, in data formats, data types, or data objects, seamlessly while minimizing delay. Additionally, applying the contextual information may avoid triggering an error by one of the applications due to inability to process a particular data format, data type, or data object.

Figure 2D:
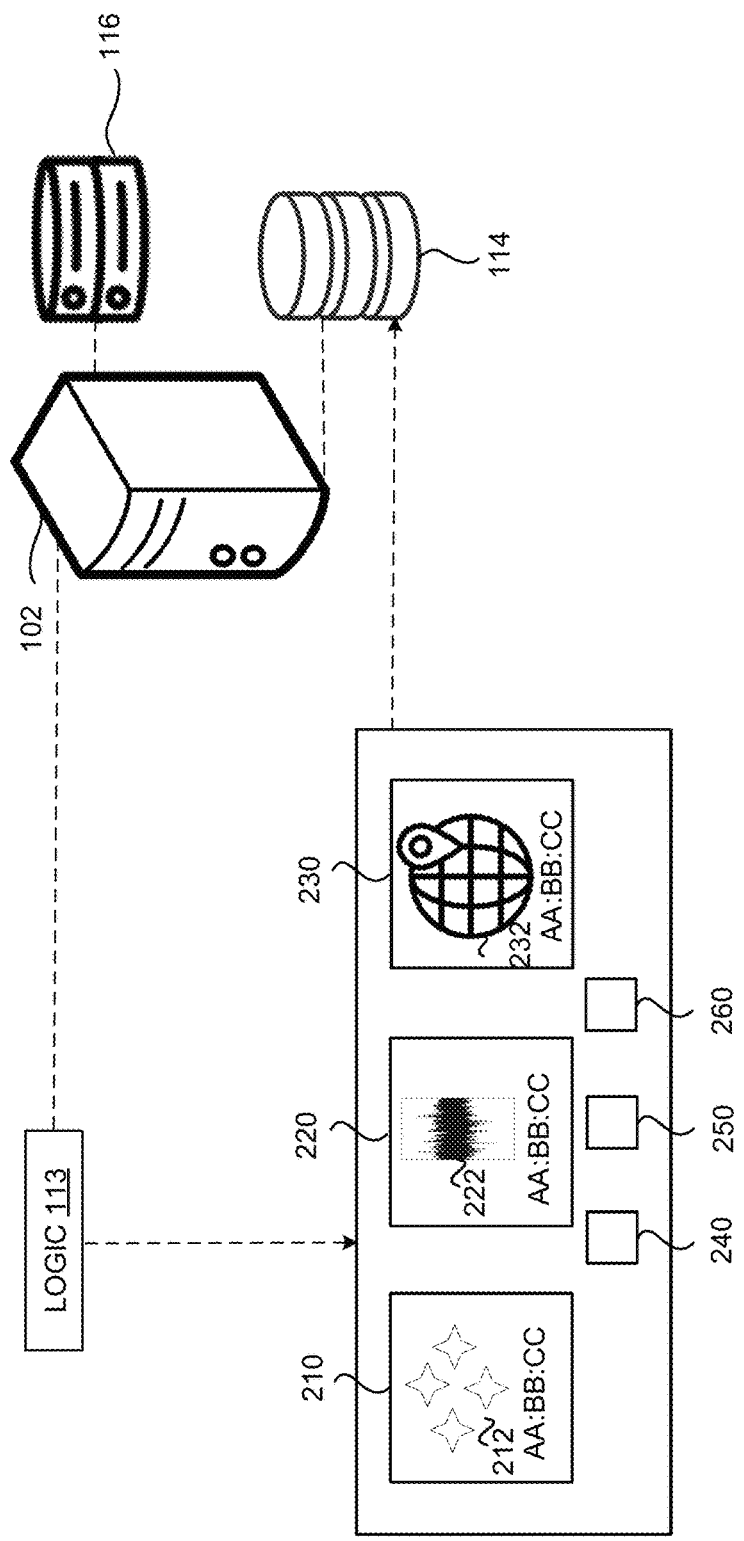
FIG. 2D illustrates an example implementation of coordinating execution statuses of applications, in accordance with various embodiments.

FIG. 2D illustrates an example implementation of coordinating execution statuses of applications. A running status of an application may be adjusted based on an amount of available computing resources on a computing device on which the applications run and/or based on one or more changes to file formats, attributes or types of data fed into applications. For example, a first subset of applications may be in a running status if they are currently operating, while a second subset of applications may be in a paused status and a third subset of applications may be in an inactive status. In particular, any applications that are currently operating may be in a running state, while other downstream applications such as immediate downstream applications, which are currently not running but will be, or will likely be, subsequently running within a particular threshold duration with some threshold probability, may be in a paused status. For example, such applications in a paused status may include downstream applications that were selected by the user as described in FIG. 2A. Other applications which were not selected by a user, not determined to be compatible with data types, data formats, and/or data objects, determined to be incompatible with data types, data formats, and/or data objects, and/or unlikely to be running within a particular threshold duration, may be in an inactive status. In the implementation of FIG. 2D, the applications 210, 220, and 230 may be in a running status. The applications 240, 250, and 260, which are downstream, may be in a paused status so that they can be automatically switched to a running status instantaneously once the logic 113 determines or receives an indication that data from one or more upstream applications has been outputted or processed. A paused status may entail unmounting a front end of an application. The logic 113 may capture a most recent update or snapshot made to an application, to be saved, in a paused status. The most recent snapshot may include analyses in progress, and/or saved settings of such, including filters. In some embodiments, particular aspects or portions of data from the applications may be saved separately, for example, within separate portions or partitions of the database 114 or the cache 116 representing separate sessions. For example, the applications of FIG. 2A may process and analyze navigational data from different vehicles concurrently or simultaneously. The data of each vehicle may be saved within separate sessions.

In the context of FIG. 2A, once the LiDAR data 212, the IMU data 222, and the GPS data 232 has been processed or output by the applications 210, 220, and 230, respectively, the application 240 may automatically be switched to a running status while the applications 210, 220, and 230 may automatically be switched to an inactive status. Similarly, once the application 240 has completed processing of or outputted data types or data objects of a map, and a coordinate data type or a matrix data object indicative of a location, the applications 250 and 260 may automatically be switched to running statuses while the application 240 may automatically be switched to an inactive status. In a paused status, an application may consume a reduced amount of computing resources compared to running applications and may be relegated to a background. Other applications which are not illustrated in FIG. 2D, and are unlikely to be implemented, unselected, and/or determined not to be compatible with data objects, data types, data formats, and/or other data criteria, may be in an inactive status, so that they consume zero to a minimal amount of computing resources.

In some embodiments, the logic 113 may determine an amount of computing resources or an available amount of computing resources on a computing device (e.g., the computing device 104 or another computing device) that operates the applications 210, 220, 230, 240, 250, and 260. The logic 113 may automatically adjust an amount of, and which, applications that are currently in a running or operational status based on the amount of computing resources or the available amount of computing resources. Therefore, the logic 113 may streamline efficiency of the running of the applications 210, 220, 230, 240, 250, and 260 while preventing overloading of a computing device. For example, if the logic 113 determines that the amount of computing resources or the available amount of computing resources is inadequate to maintain all three applications 210, 220, and 230 in running statuses, the logic 113 may relegate one or more of those applications to a paused status depending on the amount of computing resources or the available amount of computing resources. In other embodiments, if particular applications are constantly receiving or ingesting data outputted by one or more other applications at a high frequency, such as, at a higher than threshold frequency, then, given adequate computing resources or available computing resources, the logic 113 may keep those particular applications in a running status even if they are not concurrently running with the other applications. For example, in FIG. 2D, if the application 240 is frequently ingesting data outputted by the applications 210, 220, and 230, even if the application is not running concurrently with or in parallel with the applications 210, 220, and 230, the application 240 may also be converted to a running status while the applications 210, 220, and 230 are in a running status, given adequate computing resources or available computing resources. Similarly, the logic 113 may adaptively transform or convert certain applications between a paused status and an inactive status based on an amount of computing resources or an available amount of computing resources on a computing device. In some embodiments, the amount of computing resources may be indicative of an amount of memory or hard-drive capabilities or capacities.

Overall, the logic 113 may perform adjusting running statuses of the applications based on an amount of available computing resources (e.g., memory and/or other processing resources such as processing power dissipation, which may be measured in Watts or Watt-hours) and/or a predicted amount of available computing resources on a computing device on which the applications run and based on one or more changes to file formats of files fed into the respective applications, the running statuses including or indicating an operational state, a paused state that consumes less computing resources compared to the operational state, and an inactive state that consumes less computing resources compared to the paused state, the adjusting of the running statuses comprising determining a number of the applications to be in an operational state, for example, based at least in part on the amount of the available computing resources or the predicted amount of the available computing resources. For example, the predicted amount of the available computing resources may be based on or dependent upon which applications, and/or a number of applications scheduled or predicted to be run and/or operational (e.g., in the operational status) at a future time, such as a particular range or point of time in a future (e.g., in a subsequent one hour span). In particular, at a specific future point of time, the logic 113 may limit a number of applications scheduled to run, and/or an amount of computing resources scheduled to be run. Additionally, which file format is fed into an application may also affect an amount of computing resources consumed by the application. Therefore, if a change in a file format causes an amount of computing resources to increase for a particular application, then the logic 113 may increase a number of applications that are running on a paused state and/or an inactive state. However, if a change in a file format causes an amount of computing resources to decrease for a particular application, then the logic 113 may decrease a number of applications that are running on a paused state and/or an inactive state. The determination of which applications are to be run in an operation state may depend, for example, on a frequency of utilization of the applications and/or a time and/or resources consumed as a result of starting up the application, and/or to transition from the inactive state to the paused state, and/or from the paused state to the operational state. For example, if an application takes a comparatively long time and/or consumes a high amount of computing resources to transition from an inactive or paused state to the operational state, the logic 113 may prioritize that application to be in an operational state over other applications. Therefore, adjusting running statuses of the applications based on an amount of available computing resources may entail relegating a subset of any applications of lower priority to be in an operational state before relegating any applications of higher priority.

FIG. 3 illustrates an example implementation in which an output is sequentially modified at each application. Therefore, whereas in FIGS. 2A, 2B, 2C, and 2D, outputs of at least some of the applications 210, 220, 230, 240, 250, and 260 may have different data objects, data formats, and/or data types, in FIG. 3, outputs at the applications may have at least a common data object, data format, and/or data type. Specifically illustrated in FIG. 3 is a sequential training process, for example, as applied to a machine learning model. Although FIG. 3 illustrates a training process, implementations are not to be construed as limited to a training process, but rather may apply to any process that sequentially modifies an entity or data such as a data object.

The application framework 118 may be executed to provision applications including 310, 320, 330, and 340. A machine learning model 305, or a representation thereof, may be ingested into the application 310. Additionally, attributes or characteristics of the machine learning model 305, including a type of and tasks to be performed or capable of being performed by the machine learning model, may be ingested into the application 310. Other attributes of the machine learning model 305 may include a current training status indicating how the machine learning model 305 has already been trained. The application 310 may generate first training data 302 for the machine learning model 305. A type of the first training data 302 may be determined based on a type and/or tasks to be performed by the machine learning model 305. For example, if the machine learning model 305 performs image processing, then the first training data 302 may include images. As another example, if the machine learning model 305 performs object recognition, then the first training data 302 may include objects of a to-be-recognized type or category and/or objects that may be commonly mistaken for objects of the to-be-recognized type or category. The application 310 may further train the machine learning model and generate an updated or trained machine learning model (hereinafter "updated machine learning model") 315. In some embodiments, the updated machine learning model 315 may be stored in the database 114 and/or cached in the cache 116. Next, the logic 113 may feed the updated machine learning model 315, or a representation thereof, into the application 320. In some embodiments, the logic 113 may feed the updated machine learning model 315 via the database 114 or the cache 116. The application 320 may perform evaluation and/or analysis of the updated machine learning model 315, such as, shortcomings of the updated machine learning model 315. For example, the application 320 may run simulations of the updated machine learning model 315. In some embodiments, results of the evaluation and/or analysis of the updated machine learning model 315 may be stored in the database 114 or the cache 116. Next, the logic 113 may feed the updated machine learning model 315, or a representation thereof, into the application, along with the results from the application 320, into the application 330. The application 330 may generate second training data 322 based on the updated machine learning model 315 and the results from the application 320. The application 330 may further train the updated machine learning model 315 using the second training data 322 and generate a second updated machine learning model 325. In some embodiments, the second updated machine learning model 325 may be stored in the database 114 and/or cached in the cache 116. Next, the logic 113 may feed the second updated machine learning model 325, or a representation thereof, into the application 340. The application 340 may perform evaluation and/or analysis of the second updated machine learning model 325, such as, shortcomings of the second updated machine learning model 325. The applications 330 and 340 may be implemented in a same or similar manner as the applications 310 and 320, respectively.

In some embodiments, instead of feeding one or more outputs of the application 320 to the application 330, the outputs of the application 320 may instead be fed back to the application 310. The application 310, instead of the application 330, may then generate the updated training data 322 and train the updated machine learning model 315. The application 310 may then generate the second updated machine learning model 325, which may be fed into the application 320. Therefore, data may be processed and/or transformed, and transmitted to different applications, in a cyclical process in FIG. 3.

Figure 4:
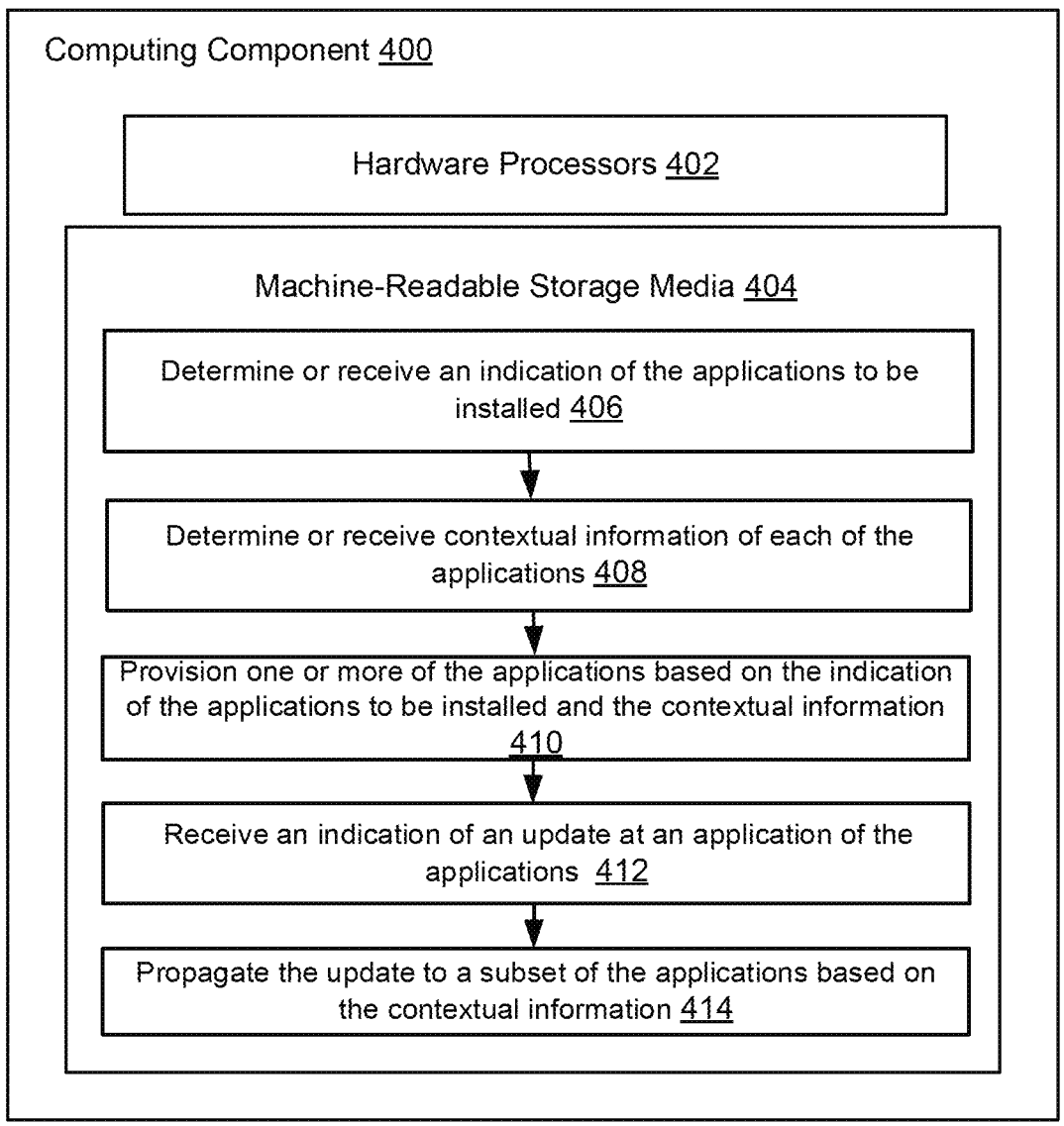
FIG. 4 illustrates a flowchart of an example method of implementing or executing an application framework, consistent with FIG. 1, in accordance with various embodiments of the present technology.

FIG. 4 illustrates an exemplary flowchart, according to various embodiments of the present disclosure. A method described in the flowchart may be implemented in various environments including, for example, the environment 100 of FIG. 1. FIG. 4 illustrates a computing component 400 that includes one or more hardware processors 402 and machine-readable storage media 404 storing a set of machine-readable/machine-executable instructions that, when executed, cause the hardware processor(s) 402 to execute an application framework to provision a workspace or a pipeline comprising applications. It should be appreciated that there can be additional, fewer, or alternative steps performed in similar or alternative orders, or in parallel, within the scope of the various embodiments discussed herein unless otherwise stated. The computing component 400 may be implemented as the computing system 102 of FIGS. 1, 2A, 2B, 2C, 2D, and 3. The computing component 400 may include a server. The machine-readable storage media 404 may include suitable machine-readable storage media described in FIG. 5, and/or the machine-readable storage media 112 of FIG. 1. The hardware processor(s) 402 may be implemented as the hardware processors 103 of FIG. 1.

In step 406, the hardware processor(s) 402 may execute machine-readable/machine-executable instructions stored in the machine-readable storage media 404 to determining or receiving an indication of the applications to be installed into the pipeline, workspace or other collaborative framework. The hardware processors 402 may determine the applications to be installed based on a computing task to be performed, and/or based on a user input or feedback. In step 408, the hardware processors 402 may determine or receive contextual information of each of the applications. The contextual information may be provided by a user and/or retrieved from a storage associated with or within the computing component 400, such as the database 114. The database 114 may include or be implemented as a registry in some embodiments. The contextual information may include one or more data objects, data types, data formats, and/or other data attributes supported by, compatible with, ingestible into, and/or recognizable by each of the applications; and one or more relationships among the applications. The data attributes may include particular ranges of values of data, and/or particular ranges of times at which the data was obtained. The relationships may indicate a sequential relationship, for example, whether an application is immediately downstream or upstream of another application.

In step 410, the hardware processors 402 may provision one or more of the applications based on the indication of the applications to be installed and the contextual information. The provisioning of the applications may include configuring applications to receive data from immediately upstream applications. For example, the application 240 in FIG. 2A may be configured to receive data from the applications 210, 220, and 230. The provisioning may also include setting access control policies of the applications across different users, groups, categories, and/or organizations. For example, a particular user in a first organization may require permission to create a new workspace or modify an existing workspace to be visible to users in a second organization, even if users in the second organization have access to the existing workspace. Such a scenario may arise when users in the first organization and users in the second organization share a common project which may include workspaces.

In step 412, the hardware processors 402 may receive an indication of an update at an application of the applications. In some embodiments, the hardware processors 402 may store the update at a database such as the database 114 or cache the update at a cache such as the cache 116. In step 414, the hardware processors 402 may selectively propagate the update to a subset of the applications based on the contextual information. For example, if a particular data object has been updated, the updated data object may be propagated only to particular applications that perform operations on the particular data object and/or are compatible with the data object.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 5:
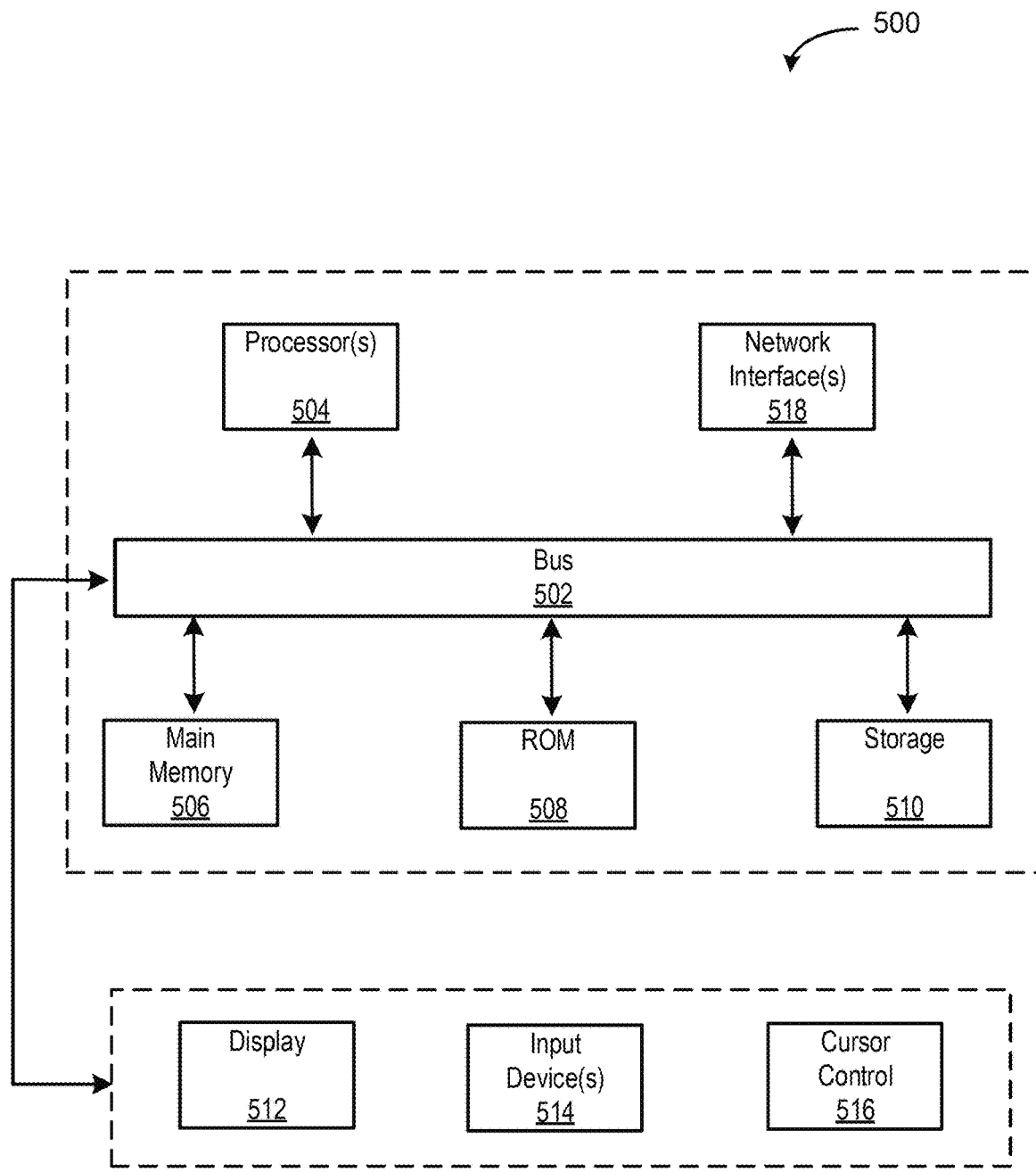
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A computing system comprising:
one or more processors; and
memory storing instructions that, when executed by the one or more processors, cause the system to perform:
  executing an application framework to provision a pipeline or workspace comprising applications, the provisioning comprising:
    determining or receiving an indication of the applications to be installed;
    determining or receiving contextual information of each of the applications, the contextual information comprising:

one or more data objects, data types, or data formats supported by each of the applications; and one or more relationships among the applications;

provisioning one or more of the applications based on the indication of the applications to be installed and the contextual information;

receiving an indication of an update at a first application of the applications;

propagating the update to a subset of the applications based on the contextual information;

receiving an indication of an update, the update comprising a modification to a data format of data to be ingested into any of the applications; and setting or modifying respective statuses of the first application and a second application of the applications, wherein the statuses comprise an operational status, a paused status, and an inactive status, wherein the setting or modifying of the statuses comprises:

setting or modifying a status of the first application or the second application to a paused status in response to the first application or the second application being currently idle and to be running within a threshold duration of time with a threshold probability and setting or modifying the status of the first application or the second application to an inactive status in response to the first application or the second application being currently idle and having less than the threshold probability to be running within the threshold duration of time.

2. The computing system of claim 1, wherein the one or more relationships comprise a reliance of a second application upon an output of the first application; and the propagating of the update comprises:

determining a generation of a data output from the first application; and in response to the determination of the generation of the data output, ingesting the data output into the second application.

3. The computing system of claim 1, wherein the instructions further cause the system to:

in response to receiving the indication of the update at the first application, caching the update at a cache; and the propagation of the update comprises propagating the update directly from the cache.

4. The computing system of claim 1, wherein the instructions further cause the system to:

receive an indication of a second update externally from the applications, the second update comprising a modification in a data format, a data object, or a data type of data that is ingested into the first application or a second application;

determine that the second update causes the modified data format, the modified data object, or the modified data type to be incompatible with an accepted input of the first application or the second application;

determine one or more updated applications that are compatible with the modified data format, the modified data object, or the modified data type; and replace the incompatible first application or the incompatible second application based on the determined one or more updated applications.

5. The computing system of claim 1, wherein the instructions further cause the system to:

adjust running statuses of the applications based on an amount of available computing resources on a computing device on which the applications run, the running statuses comprising an operational state, a paused state that consumes less computing resources compared to the operational state, and an inactive state that consumes less computing resources compared to the paused state, the adjusting of the running statuses comprising determining a number of the applications to be in an operational state.

6. The computing system of claim 5, wherein the adjusting of the running statuses comprises determining particular applications to convert to the operational state based on frequencies at which the applications ingest data.

7. The computing system of claim 1, wherein the applications within the pipeline or the workspace collaboratively determine an actuation to be performed on a physical component.

8. The computing system of claim 1, wherein the determination or receiving of the contextual information of each of the applications comprises determining the relationships based on comparisons between second data objects, second data formats, or second data types generated as outputs by the respective applications and the data objects, data types, or data formats supported by the applications.

9. The computing system of claim 1, wherein the contextual information further comprises ranges of values of data or ranges of times at which data was captured.

10. The computing system of claim 1, wherein the controlling of the statuses is based on predicted amounts of available computing resources associated with the applications, wherein the controlling of the statuses comprises switching between paused statuses and inactive statuses based on predicted amounts of available computing resources, wherein the paused status switches to the operational status within a shorter duration of time compared to the inactive status switching to the operational status.

11. The computing system of claim 1, wherein the receiving of the indication of the update to the characteristic of the data comprises receiving multiple updates to a data format of the data from different sources and selecting a particular update based on relative priorities or degrees of trustworthiness of the different sources.

12. The computing system of claim 1, wherein the paused status switches to the operational status within a shorter duration of time compared to the inactive status switching to the operational status.

13. A computer-implemented method of a computing system, the computer-implemented method comprising:

executing an application framework to provision a pipeline or workspace comprising applications, the provisioning comprising:

determining or receiving an indication of the applications to be installed;

determining or receiving contextual information of each of the applications, the contextual information comprising:

one or more data objects, data types, or data formats supported by each of the applications; and one or more relationships among the applications;

provisioning one or more of the applications based on the indication of the applications to be installed and the contextual information;

receiving an indication of an update at a first application of the applications;

propagating the update to a subset of the applications based on the contextual information;

controlling respective statuses of the applications, wherein the statuses comprise an operational status, a paused status, and an inactive status;

receiving an indication of an update, the update comprising a modification to a data format of data to be ingested into any of the applications; and setting or modifying respective statuses of the first application and a second application of the applications, wherein the statuses comprise an operational status, a paused status, and an inactive status, wherein the setting or modifying of the statuses comprises:

setting or modifying a status of the first application or the second application to a paused status in response to the first application or the second application being currently idle and to be running within a threshold duration of time with a threshold probability and setting or modifying the status of the first application or the second application to an inactive status in response to the first application or the second application being currently idle and having less than the threshold probability to be running within the threshold duration of time.

14. The computer-implemented method of claim 13, wherein the one or more relationships comprise a reliance of a second application upon an output of the first application; and the propagating of the update comprises:

determining a generation of a data output from the first application; and in response to the determination of the generation of the data output, ingesting the data output into the second application.

15. The computer-implemented method of claim 13, further comprising:

in response to receiving the indication of the update at the first application, caching the update at a cache; and the propagation of the update comprises propagating the update directly from the cache.

16. The computer-implemented method of claim 13, further comprising:

receiving an indication of a second update externally from the applications, the second update comprising a modification in a data format, a data object, or a data type of data that is ingested into the first application or a second application;

determining that the second update causes the modified data format, the modified data object, or the modified data type to be incompatible with an accepted input of the first application or the second application;

determining one or more updated applications that are compatible with the modified data format, the modified data object, or the modified data type; and replacing the incompatible first application or the incompatible second application based on the determined one or more updated applications.

17. The computer-implemented method of claim 13, further comprising:

adjusting running statuses of the applications based on an amount of available computing resources on a computing device on which the applications run, the running statuses comprising an operational state, a paused state that consumes less computing resources compared to the operational state, and an inactive state that consumes less computing resources compared to the paused state, the adjusting of the running statuses comprising determining a number of the applications to be in an operational state.

18. The computer-implemented method of claim 17, wherein the adjusting of the running statuses comprises determining particular applications to convert to the operational state based on frequencies at which the applications ingest data.

19. The computer-implemented method of claim 13, wherein the applications within the pipeline or the workspace collaboratively determine an actuation to be performed on a physical component.

20. The computer-implemented method of claim 13, wherein the determination or receiving of the contextual information of each of the applications comprises determining the relationships based on comparisons between second data objects, second data formats, or second data types generated as outputs by the respective applications and the data objects, data types, or data formats supported by the applications.

* * * * *